United States Patent [19]
Gehlbach et al.

[11] Patent Number: 5,115,416
[45] Date of Patent: May 19, 1992

[54] ACTIVE TRANSDUCER ASSEMBLY FOR A PHASED ARRAY DEPTH SOUNDER

[75] Inventors: Steve M. Gehlbach, 1825 Austin Ave., Los Altos, 94024; K. L. Venkatachalam, Palo Alto, both of Calif.

[73] Assignee: Steve M. Gehlbach, Los Altos, Calif.

[21] Appl. No.: 741,649

[22] Filed: Aug. 7, 1991

[51] Int. Cl.$^5$ ............................................. H04B 1/02
[52] U.S. Cl. .................................. 367/138; 367/103; 367/105
[58] Field of Search ............. 367/103, 105, 165, 173, 367/188, 138; 73/633

[56] References Cited

U.S. PATENT DOCUMENTS

4,991,441  2/1991  Nottingham et al. ................. 73/633

*Primary Examiner*—Daniel T. Pihulic
*Attorney, Agent, or Firm*—Flehr, Hohbach, Test, Albritton & Herbert

[57] ABSTRACT

A phased array acoustic transducer apparatus has a controller and an array of ultrasonic transducers mounted in a water tight housing. Also included in the water tight housing are a transmitter circuit which sends phased excitation signals to the array of ultrasonic transducers so as to generate a directed beam of acoustic energy. A receiver circuit, located in the water tight housing, processes and combines signals received by the array of ultrasonic transducers to generate an output signal. The controller sends both power and control signals via a cable to the transmitter and receiver circuits. The cable uses a simple serial data line and a clock signal line to transmit beam angle control signals, thereby minimizing the size of the cable. The controller sends transmitter gating signals over a gate signal line on the cable to enable and disable operation of the transmitter circuit, such as is required for a pulse-echo mode of operation. In a preferred embodiment, the system includes a display unit coupled to the controller. The controller automatically sends a sequence of control signals that cause the transmitter circuit, in conjunction with the array of ultrasonic transducers, to generate a sequence of directed beams of acoustic energy. The controller automatically collects the resulting output signals from the receiver circuit and generates therefrom a corresponding image on the display unit.

8 Claims, 5 Drawing Sheets

ACTIVE TRANSDUCER ASSEMBLY FOR A PHASED ARRAY DEPTH SOUNDER

The present invention relates generally to acoustic transducer assemblies, and particularly to low cost depth sounder and underwater imaging systems for applications such as locating fish and underwater reefs.

BACKGROUND OF THE INVENTION

Depth sounders are used by watercraft to echo-locate underwater terrain and to locate and identify fish. They do this by sending out a burst of acoustic energy from a transducer, and then subsequently use the same transducer to receive the returned echoes, and amplify and display the echoes on a CRT or LCD display. Conventional depth sounders, as implemented in small and medium sized boats, send out the energy collimated in a single beam, and by repeatedly pinging the transducer, use the motion of the boat to "paint" a two dimensional image of the area over which the boat has passed. More elaborate systems, that move the transducer beam either mechanically or electronically, are too large and too expensive for the small boat owner.

However, it is desired by the small to medium sized boat owner to have a depth sounder that can paint an image of the region under a boat, without using boat motion to provide one axis, and do this in real time or near real time. This could be done with a phased array, which electrically deflects the beam, if the size and cost were within practical limits for the small boat owner.

A phased array is an array of transducers, usually arranged in a linear row, the individual transducers being individually excited with a sinusoidal voltage that has an appropriate delay and/or phase shift to produce a beam of energy in a pre-determined angle or direction. For a linear array, the possible angles of beam deflection are limited to the plane formed by a line through the array elements and a line normal to the transmitting surfaces of the array. See FIG. 1. Techniques of this type date back many years using both acoustic and electromagnetic energy. An early patent using only delay line techniques for submarine echo-location is described in U.S. Pat. No. 3,037,185 by G. H. DeWitz. Later patents using delay lines combined with frequency conversion and summation, describe a means of phase control for dynamic focusing, as in U.S. Pat. Nos. 4,140,022 and 4,699,009 by S. Maslak. The principle technique described in these later patents is the use of a combination of delay lines and mixer phasing to control the deflection angle and focal point of the beam.

DIFFERENCES BETWEEN FOCUSED IMAGING SYSTEMS AND PRESENT INVENTION

Focusing, however, is only effective in the near field of a lens. The distance to the near field/far field transition is defined as:

$$r_{nf} = \frac{D^2}{4\lambda_0} \quad (1)$$

where $r_{nf}$ is the radius to the near field, D is the length or diameter of the lens or aperture, and $\lambda_0$ is the wavelength of the center frequency of the propagating wave in the medium. For most situations in depth sounders, the center frequency is near 200 KHz ($\lambda_0 = 0.300$ inches in water), and the aperture is one to two inches across.

Substituting these values into Equation (1), one can determine that the near field is well within one foot of the transducer. Depth sounding and ranging is done from depths of 5 feet to 1000 feet, and therefore focusing is not effective at these depths since it is in the far field. What is important to depth sounders is beam steering or beam angle control, to direct the beam in a pre-determined direction, focused in effect at infinity.

In addition to not having the requirement of focusing, conventional depth sounders have another simplification over medical and submarine applications. This simplification is that the pulse lengths used are frequently very long, i.e., contain many cycles of the center frequency. Another way to state this is that the systems are narrow-band. A narrow-band phased array system can be steered with simple carrier phase control, and delay lines are not required. In a wide-band system, delay lines are used to coarsely align the pulse envelopes, and carrier phasing is then used to align the sinusoids within the pulse envelopes. A narrow-band system has such long pulse envelopes, compared to the center frequency of the excitation, that pulse envelope alignment is not necessary. The result is that a beam can be steered in a depth sounder, to an acceptable approximation, by merely phase shifting the transmitted signal (forming the transmitted beam), and phase shifting and combining the returned received signals. Although electronic phase shifters can be used, the received signals can most easily be phase shifted by the use of mixers, combined with a filter to select the upper or lower sideband. Mixers (or heterodyning) techniques preserve the phase of the input signal, and directly add to its phase the phase of the local oscillator signal, as described in more detail in U.S. Pat. No. 4,140,022.

In summary, depth sounders used for bottom mapping or fish location differ from prior art in two major simplifications: (1) focusing is not required because all imaging occurs in the far field, and (2) delay lines are not required, since the beam can be steered entirely with phase shifting due to the narrow band nature of the signals used.

CABLE SIZE CONSIDERATIONS

Most recreational boats have depth sounders that are installed by the owner. The owner is reluctant to make large holes in the boat for the passage of large cables to the transducer assembly, which is necessarily mounted below the water line. The cable then runs from the transducer up to the display unit which is mounted in view of the boat operator. A phased array might require 8-16 elements to be effective, in which case at least 8 or as many as 16 cable pairs are required from the transducer assembly to the display unit. It is also very important to the operation of the phased array system, for these individual cables to have a high degree of isolation between them, or beam steering quality is severely reduced due to cross-talk effects. For this reason, and for the reduction of noise and interference from the engine and other sources, the cables must be individually shielded or coaxial. These individual shielded cables are therefore larger than single wires, and make the resulting cable from the transducer assembly bulky and expensive. Therefore there is a need for a transducer assembly that reduces the size and number of wires in the cable, as well as the cable cost. In addition, if the transmitting and receiving electronics could be located adjacent to the transducer, the transmitter power losses in the cabling due to its length, and the tendency for the receiver to pick-up noise from the engine and nearby radio transmitters would be eliminated. The more elements the array contains, the more compelling the need for a reduction in the cabling requirements. This could be quite useful for recreational boats, but would also be very useful for commercial craft that have arrays with 100 or more elements.

Two dimensional arrays, which are much more complex but can deflect the beam to any angle in the hemisphere of the transmitted signal, would also benefit greatly from an integrated transducer assembly, due to the substantial number of transducer elements required.

OBJECTS AND SUMMARY

It is a primary object of the present invention to provide a low cost phased array depth sounder suitable for use in small boats. It is also an object of the present invention to provide a cabling and control system for a transducer assembly that uses as few cables as possible and that minimizes the number of shielded cables used, thereby minimizing the size of the hole in a boat's hull that is required for installation of the phased array depth sounder.

The present invention integrates the beam steering electronics into the transducer assembly in an economical and space efficient manner. By doing so, the bulk and expense of the multiplicity of shielded or coaxial signal cables from each transducer element to the display unit are eliminated, and in their place a single combined analog signal is supplied to the display unit, making the system practical for small water craft. Additional wires in the cable are needed for digital control to set the beam angle, and power for the electronics in the transducer assembly, but these wires can be fine gauge and need not be shielded.

In the beam control electronics in the transducer assembly, advantage is taken of simplifications that are possible in depth sounders over prior art implementations, with the use of mixers for phase shifters, and the elimination of delay lines and focusing electronics. A simple serial digital interface, in the preferred embodiment, allows the phase control information to be clocked to the assembly to set up the array for a given beam angle. In situations where it is desired to integrate the phase control data into the transducer assembly, a second form of the invention is shown which allows the display unit to send a simple angle command, over a serial interface, to the transducer assembly. In this latter form, the transmit and receive phasing information is stored in a ROM that is appropriately pre-programmed.

This invention groups the electronics to be located in the transducer assembly in such a manner as to anticipate placing the circuitry on one or more linear and digital integrated circuits. In this way, the electronics that is located in the transducer assembly is minimized in size, which is a major consideration. A large and bulky transducer assembly would impede the motion of the boat and be unsatisfactory.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 2:
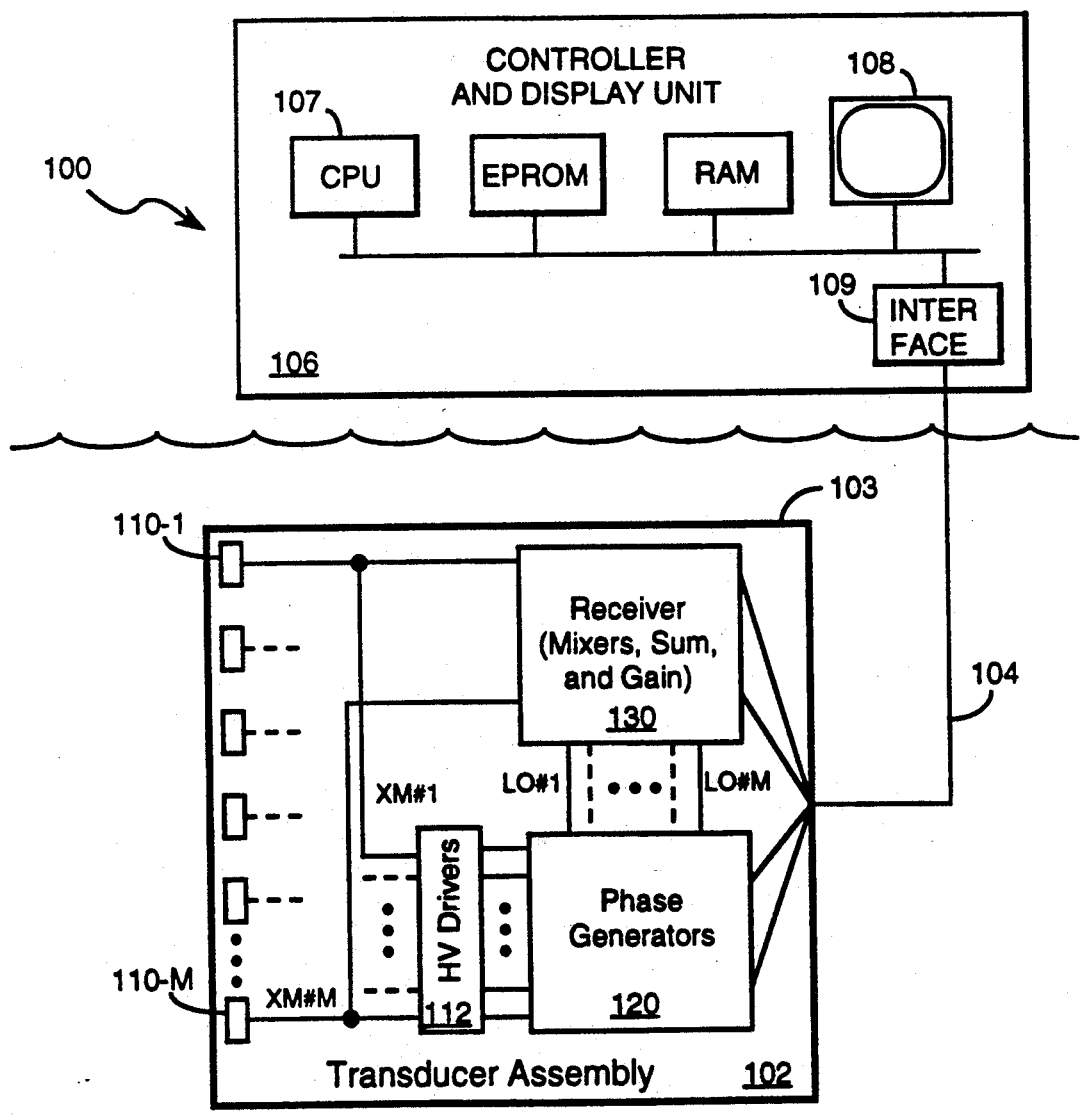
FIG. 2 is a block diagram of a phase array depth sounder system in accordance with the present invention.

Referring to FIG. 2, a phased array depth sounder 100, consists of a transducer assembly 102 connected by cable 104 to a controller and display unit 106. The controller/display unit 106 includes a programmed microcontroller (CPU) 107, display 108, and an interface 109 to the cable 104. The transducer assembly 102 is mounted and packaged in a water tight housing 103 so that it can be operated under water. The assembly 102 contains M transducer elements 110, where M may be any integer number from perhaps eight to well over one hundred. The transducer elements 110 are pulsed by a plurality of excitation voltages from high voltage drivers 112. The excitation voltages are typically digital waveforms (a square wave of 50% duty cycle), having a center frequency nominally identical to the center frequency of the transducer 110. Typical center frequencies range from 50 KHz to 450 KHz, with 200 KHz a more common value.

The excitation voltages have a finite time duration, and differ from each other in the precise phase of the square wave. The phase of each square wave is chosen to produce a beam of acoustic energy from the transducer array 102 that has maximum amplitude in a predetermined direction or angle. The phases are generated by phase generators 120 that are controlled by a data bus from the controller 106. The process of creating an image on the display unit 108 consists of applying the excitation voltage to the transducers 110 for a finite time period, usually several milliseconds, then sampling the output of the receiver 130 to detect any returning echoes. The distance of objects is proportional to the time delay associated with the returning echoes, and thus images are positioned on the display unit 108 accordingly.

Figure 3:
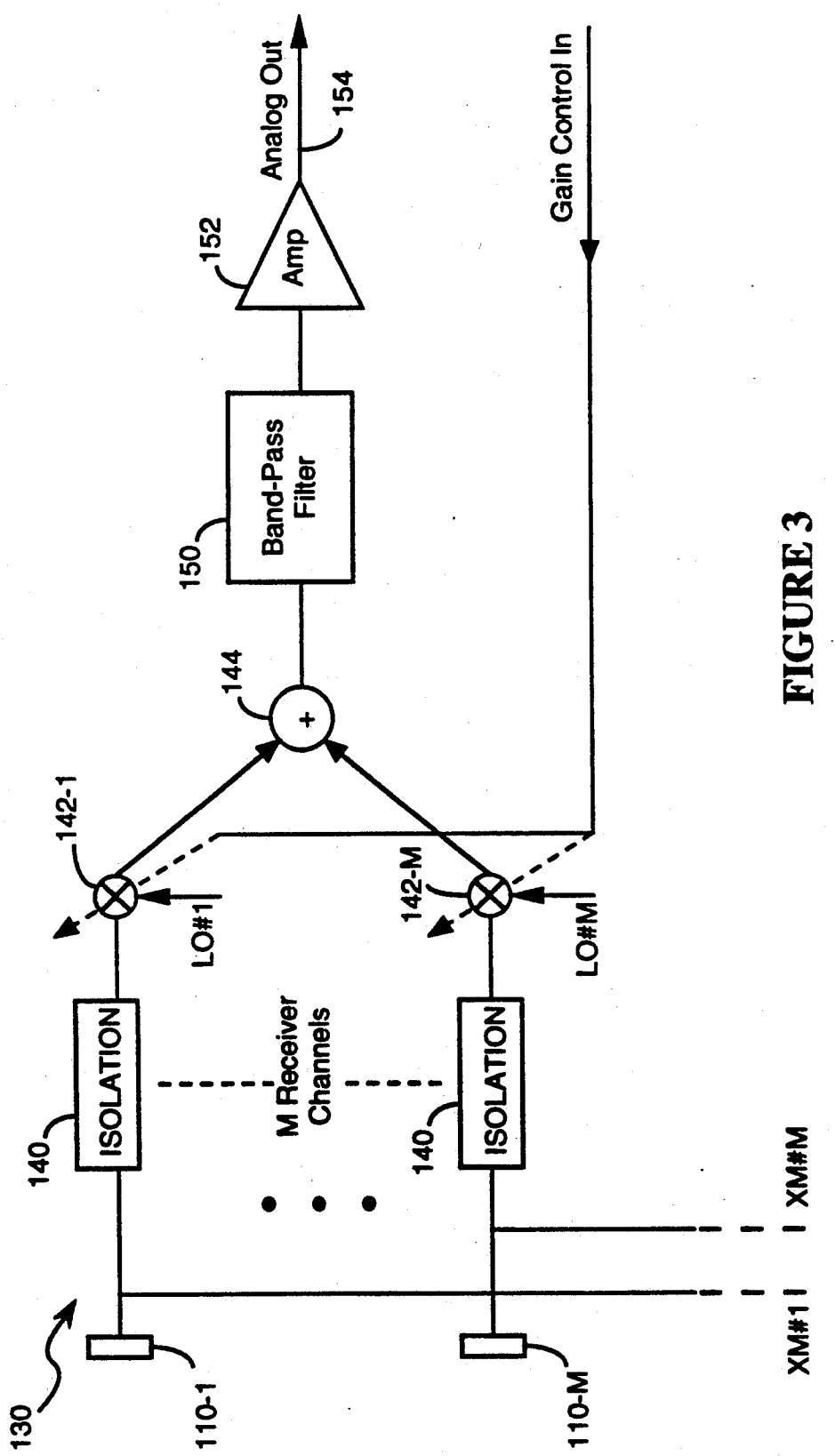
FIG. 3 is a block diagram of the receiver circuit in the system of FIG. 2.

The receiver 130 contains the proper electronics to phase shift and sum the returning echoes to produce a maximum output at the same predetermined beam angle to which the transmitter was set. A detailed block diagram of the receiver 130 is shown in FIG. 3.

Figure 4:
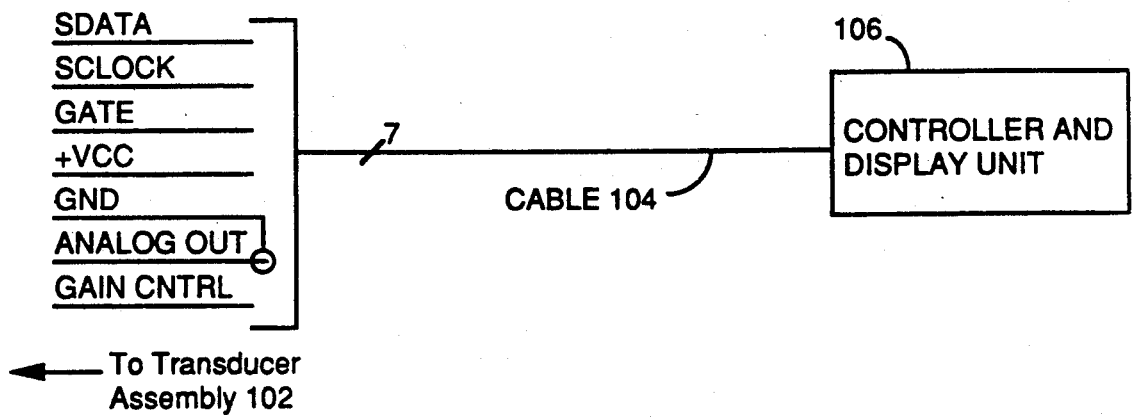
FIG. 4 depicts the cable wires between the transducer assembly and the controller in the system of FIG. 2.

As further illustrated in FIG. 4, the interconnecting cable 104 to the controller 106 contains wires for the combined received signal (one shielded wire), gain control (one unshielded wire), and a serial data interface (three wires: one data signal, one clock signal, and a transmit GATE signal) to control the phases of the mixers and transmitters, and to gate the transmit signal. Power to the transducer assembly 102 is also required and provided by two wires (+VCC and GND) in cable 104. Prior to any transmission and reception process, a data signal is clocked over cable 104 to phase generators 120. This process sets up the local oscillator phases applied to the plurality of mixers contained in receiver 130, and excitation voltages that are applied to the plurality of high voltage drivers 112.

As shown, the cable 104 uses only one shielded wire and a total of just seven wires altogether. This is to be contrasted with the prior art approach, requiring eight shielded wires for an array of eight transducers. For an array with, say, a hundred transducers (e.g., a ten by ten array for three dimensional imaging), the number of wires in cable 104 would not change, while the brute force approach would require a hundred shielded cables. Thus, the present invention provides a cabling and control system that uses as few cables as possible and minimizes the number of shielded cables used. This minimizes the size of the hole in a boat's hull that is required for installation of the phased array depth sounder 100.

Figure 5:
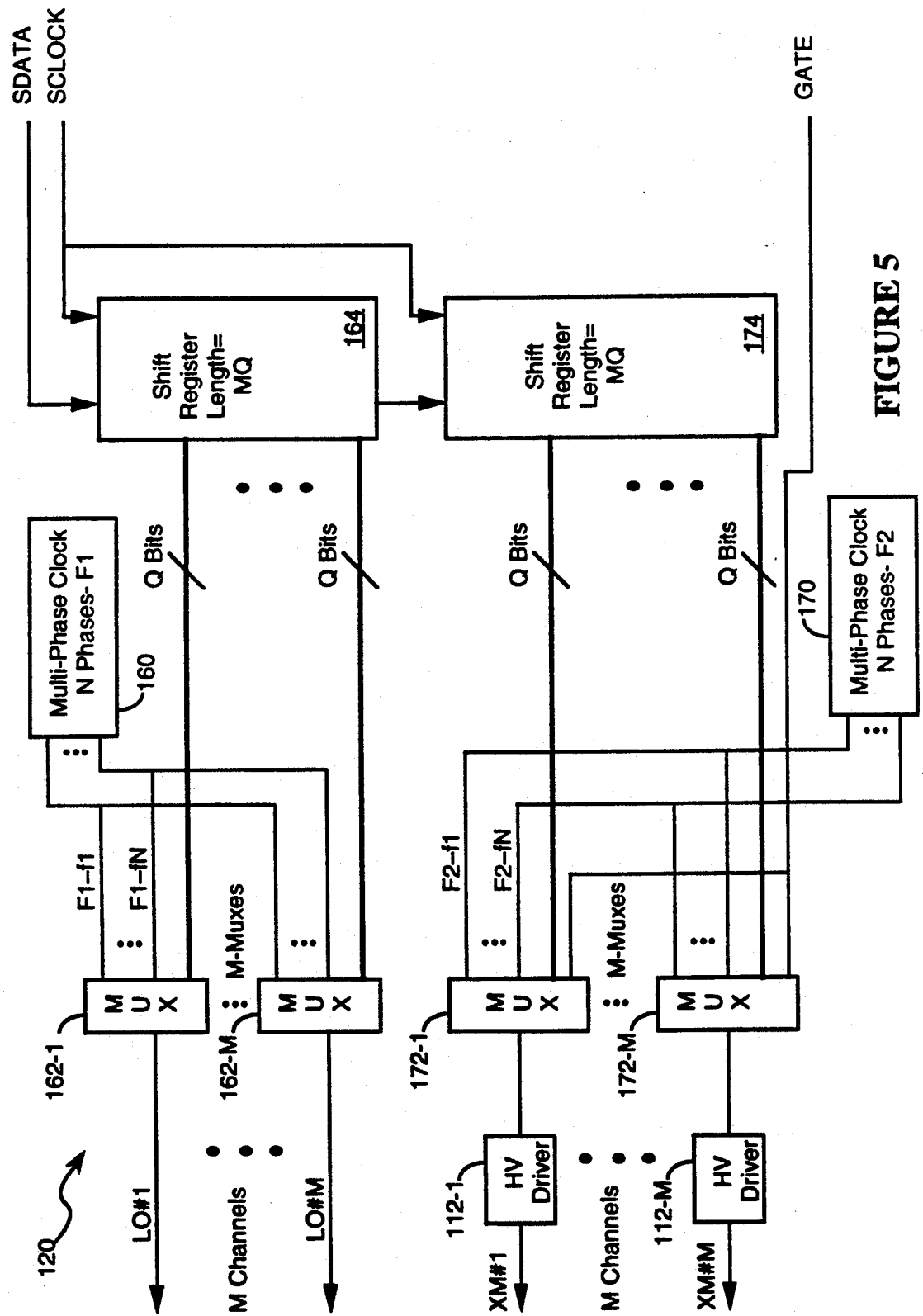
FIG. 5 is a block diagram of a first preferred embodiment of the phase generator circuitry in the system of FIG. 2.
Figure 6:
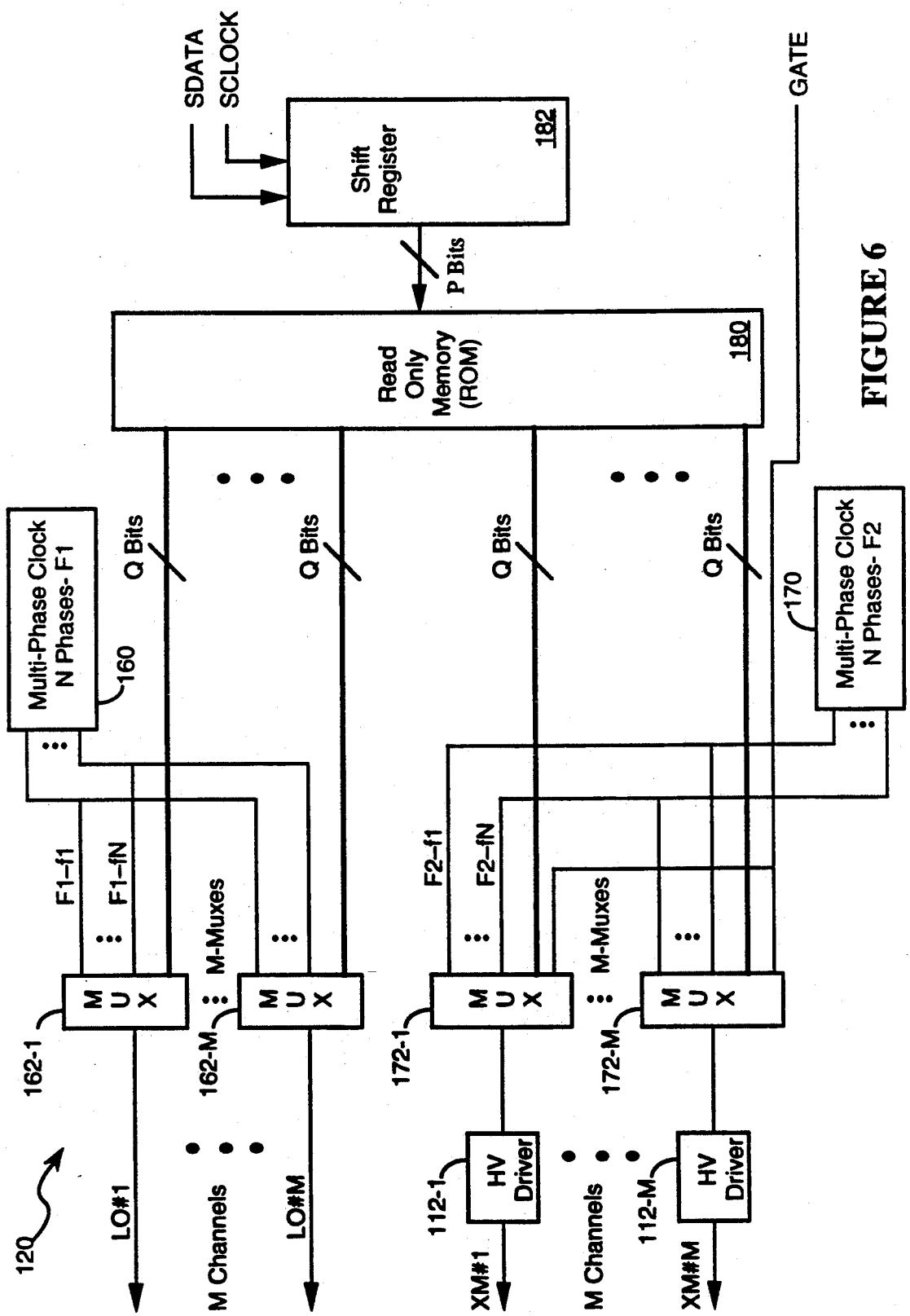
FIG. 6 is a block diagram of a second preferred embodiment of the phase generator circuitry in the system of FIG. 2.

A detailed view of two approaches to producing the phase generator signals is shown in FIGS. 5 and 6. The preferred method is that of FIG. 5.

RECEIVER

A detailed block diagram of the receiver is show in FIG. 3. The receiver contains a plurality of isolation circuits 140 and mixer (or heterodyning) devices 142. There are M channels of heterodyning and isolation circuits corresponding to M transducer elements 110. The isolation circuits 140 protect the other circuitry from the high voltage drivers 112, but allow the low level signals detected by the transducers 110 when functioning as receivers to pass through. Each mixer device 142 mixes (or heterodynes) the received signal with a local oscillator signal identified here as LO#1-LO#M. These local oscillator signals are generated with appropriate phases from the phase generator circuitry 120 of FIG. 5. By mixing with appropriately chosen local oscillator phases, each received signal is phased shifted by an appropriate amount so that all of the signals received from the M transducer elements 110 are phase coherent when originating from a given angular direction. After mixing, all M channels are summed together using summer 144 and bandpass filtered by filter 150. Bandpass filter 150 selects either the upper or lower sideband, depending on the system design. Typically, in a fish finder, a 200 KHz transducer signal is used, a 650 KHz local oscillator, and a commonly available 450 KHz bandpass filter to select the lower sideband. After amplification by amplifier 152, the analog output signal is transmitted via cable line 154 (on cable 104) to the controller 106.

The mixer 142 can also function as a gain control circuit, by the application of a variable analog signal GAIN CONTROL IN from cable 104. The GAIN CONTROL IN signal varies the gain of the mixer, and in doing so allows the system gain a vary, under control of the operator viewing the display unit 106. In application, most of the circuitry of FIG. 3 can be integrated on a single analog integrated circuit fo a compact and low cost implementation.

PHASE GENERATORS

The phase generators 120 for generating the transmit signals XM#1-XM#M and local oscillator signals LO#1-LO#M are shown in FIG. 5. The local oscillator signals are selected from a plurality of clock signals F1-f1 to F1-fN produced by multi-phase clock generator 160. Since it would be impractical to precisely produce all local oscillator phases required for all steering angles needed by the array, the phase is quantized. Experiments, simulations, and data reported by U.S. Pat. No. 4,140,022 indicate that eight phases (45 degree quantization, maximum $+/-22.5$ degree error) are usually adequate, and rarely are more than sixteen phases are ever needed. Phase quantization to an even power of two is not necessary, but may be convenient for digital circuitry. Therefore for the N phase clock generator 160, N is usually a number between eight and sixteen.

The N signals from multi-phase clock 160 are supplied to a plurality of multiplexers 162-1 to 162-M, each of which selects one of the clock phases based on a plurality of Q-bit signals from shift register 164. The number of bits Q is determined by N, the number of clock phases, so that $Q = \log_2(N)$, where · is the ceiling function, which selects the smallest integer greater than the real number argument. Shift register 164 is loaded prior to the activation of the GATE signal by the controller 106. Shift register 164 is loaded with a bit pattern that sets each multiplexer 162, to select the correct clock phase from clock generator 160 to steer the received beam at a predetermined angle from the normal. The transmitter phases are set up in a similar manner with multi-phase clock generator 170, multiplexers 172 and shift register 174 as shown in FIG. 5, to steer the transmitted beam to the identical steering angle as the receivers.

The transmitter multiplexers 172 are enabled only when the GATE signal is activated. In this way, by pylsing the GATE signal, the transducer assembly 102 produces directed a directed beam of acoustic energy for a short period of time (e.g. between 0.2 and 2 milliseconds), followed by a period of time in which the beam is turned off and receiver 130 listens for echoes of the transmitted signal. This is sometimes called a pulse-echo mode of operation.

Figure 7:
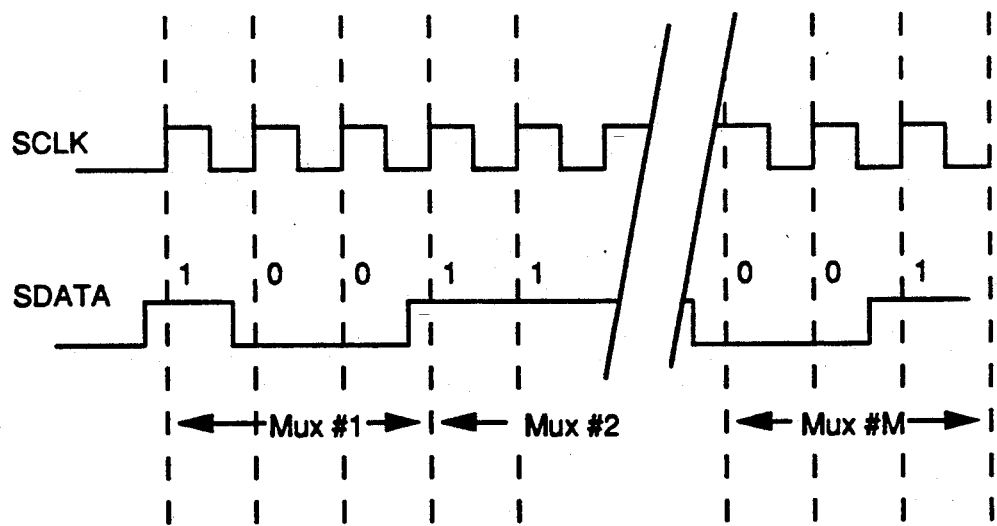
FIG. 7 is a timing diagram of the clock and data line signals used in the preferred embodiment.

The SCLOCK and SDATA signal waveforms, for the instance where $Q=3$, are shown in FIG. 7. On each the rising edge of the SCLOCK signal, the shift register 164 samples the SDATA line and places either a logical one or a logical zero into the shift register, depending on the state of SDATA for each clock signal. A total of $2 \cdot M \cdot Q$ bits are clocked into the two shift registers 164 and 174, to hold the phase settings for the transmitters and receiver mixers.

The only difference between the transmitter multi-phase clock generator 170, and the receiver multi-phase clock generator 160 is the frequency. The transmitter multi-phase clock generator 170 is at frequency F2, the center frequency of the transducer. The receiver multi-phase clock generator 160 is at frequency F1, which is chosen to shift the transducer frequency to a convenient intermediate frequency for filtering and further amplification. For a typical fish finder application, F1=650 KHz, and F2=200 KHz. The phase shift of the received signals is preserved through the heterodyning process, and by adjusting the relative phase of the local oscillator signals LO#1-LO#M, the received signals can be phased aligned for a given beam angle.

Figure 1:
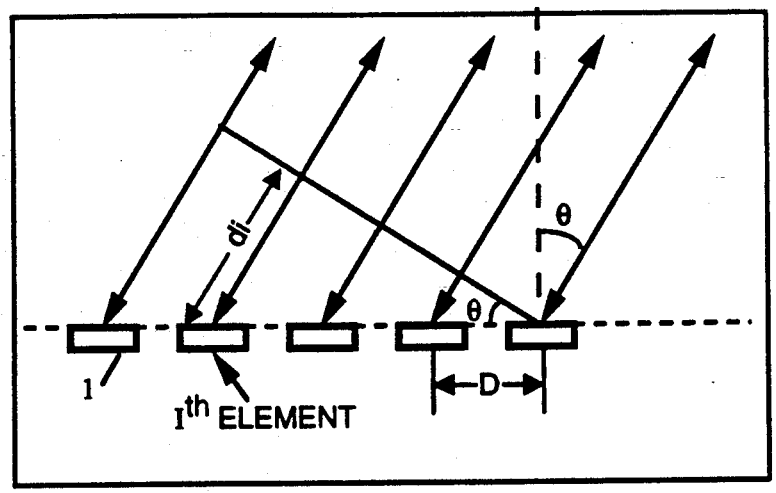
FIG. 1 schematically depicts electronic beam deflection using a phased array of transducers.

The clock phase, for both transmit and receive, can be calculated from FIG. 1 as follows. The sonic waves arrive from a distant object, in the far field, as essentially parallel rays. The time delay, referenced to one end of the array, to each transducer element 110, can be calculated using Equation (2):

$$d_i = \cdot D \cdot \sin(\theta)/V_a \quad (2)$$

where $d_i$ is the time delay, with respect to one end, to the $i^{th}$ element, D is the inter-element spacing, $\theta$ is the beam steering angle, and $V_a$ is the acoustic velocity. The phase delay $\phi_i$ at the center frequency of the acoustic signal in degrees, at the $i^{th}$ element, it then:

$$\phi_i = 360 \cdot \frac{i \cdot D}{\lambda_0} \sin(\theta) \quad (3)$$

Normally, $\phi_i$ is computed modulo 360, and quantized to 45 degrees, as described previously. The clock phase at each multiplexer 162 is selected by the data loaded in the shift register 164 according to Equation (3), for a given steering angle $\theta$. It is important no to confuse steering angle $\theta$ with oscillator phase $\phi$. The relationship between the two is determined solely by Equation (3).

In general, a set of 2·M oscillator phase $\phi_i$ are required to steer the array of transducers 110 to a single beam angle $\theta$, and the total length of the two shift registers 164 and 174 is 2·M·Q bits. However, the M oscillator phases $\phi_i$ for transmit and receive are identical at a given beam angle $\theta$ when the array is receiving and transmitting at the precisely indentical beam angle, and so the two shift registers 164, 174 in FIG. 5 could be combined into one shift register, and only M·Q bits required. In this event, the multiplexer 162-1 for LO#1 and the multiplexer 172-1 for XM#1 would have the same Q-bit contol signal as inputs, LO#2 and XM#2 would have identical Q-bit inputs, etc. However, it is possible to improve sidelobe performance by slight mis-alignment of transmit and receive beams, and so for this reason, a completely general shift register arrangement is shown with separate transmit and receive phase control.

In a preferred embodiment, the controller 106 is programmed to automatically send a sequence of controll signals to generate a sequence of directed beams of acoustic energy which sweep across a range of angles. The controller 106 automatically collects the resulting output signals from the receiver 130 and generates therefrom a corresponding image on the display unit 108.

PHASE GENERATORS AND ROM MEMORY IN THE TRANSDUCER ASSEMBLY

It is also possible to store all of the phase information in the transducer assembly 102, rather than clocking it from the controller unit 106 to the assembly over cable 104. This alternate technique is shown in FIG. 6. A ROM (read only memory) 180 holds the phase information, and is addressed by shift register 182. Shift register 182 receives the steering angle in binary form, from controller 106. However, only a few bits are required to set the assembly 102 to a given beam steering angle, since the steering angle is normally quantized to the nearest degree. For example, to command beam angles of −100 to +100 degrees, an eight bit word is required to be sent to shift register 182.

The outputs of ROM 180 are 2·M groups of Q bits each to drive the multiplexers 162, 172 as described previously. The only advantage of the method of FIG. 6 is the reduced data communication time, and the simpler interface requirements, since only a simple angle number need be clocked to the transducer assembly 102. The controller 106, in the embodiment of FIG. 6, therefore need not store a large data table, since this data is stored in ROM 180 in the transducer assembly 102.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, the present invention is clearly applicable to transducer assemblies having a two dimensional array of transducers (e.g., and eight by eight or ten by ten array), suitable for three dimensional imaging of the environment below a boat. The number of electrical lines in the cable between the controller and transducer assembly remains unchanged, regardless of the number of transducers used. Thus the advantages of the present invention are even more dramatic when used with a two dimensional array of transducers.

Those skilled in the art will realize that there are other methods of storing the data in the transducer assembly 102 for beam angle control, using microprocessor look-up techniques, and a multiport digital interface, for example. Other bus interface techniques, such as a parallel bus, may also be used for the data interface to the controller and display unit 106, that are still in keeping with the spirit of this invention, the principle concept of which is to integrate the beam control electronics into the transducer housing to reduce the cabling and noise pick-up problems associated with larg phased arrays. Another alternative is to eliminate the SCLOCK signal, and use on RS-232 like interface that requires no separate clock. Similarly, there may be other ways of producing staggered or delayed clock signals to drive the transducers and receiver circuit than the multiphase clock and multiplexer circuits of the preferred embodiment. The experienced reader may see other alternatives that are still within the scope of this inventions and are merely improvements easily implemented by those skilled in the art.

What is claimed is:

1. A phased array acoustic transducer apparatus, comprising:
    a transducer assembly; and
    a controller, coupled to said transducer assembly by a cable, which sends power and control signals via said cable to said transducer asembly;
    said transducer assembly including:
        an array of ultrasonic transducers mounted in a water tight housing;
        a transmitter circuit, located in said water light housing and coupled to said array of ultrasonic transducers, which sends phased excitation signals to said array of ultrasonic transducers so as to generate a directed beam of acoustic energy; and
        a receiver cicuit, located in said water tight housing and coupled to said array of ultrasonic transducers, which processes and combines signals received by said array of ultrasonic transducers to generate an output signal.

2. The phased array acoustic transducer apparatus of claim 1, wherein said controller sends a gating signal via said cable to said transmitter circuit, said gating signal enabling and disabling operation of said transmitter ciruit.

3. The phased array acoustic transducer aparatus of claim 1, further including a display unit coupled to said controller;
wherein said controller automatically sends a sequence of controll signals that cause said transmitter circuit in conjunction with said array of ultrasonic transducers to generate a sequence of directed beams of acoustic energy, said controller automatically collecting from said receiver circuit resulting output signals and generating therefrom a corresponding image on said display unit.

4. A phased array acoustic transducer apparatus comprising:
a transducer assembly; and
a controller, coupled to said transducer assembly by a cable, which sends power and controll signals via said cable to said transducer assembly;
said transducer assembly including:
an array of ultrasonic transducers mounted in a water tight housing;
a transmitter circuit, located in said water tight housing and coupled to said array of ultrasonic transducers, which sends phased excitation signals to said array of ultrasonic transducers so as to generate a directed beam of acoustic energy;
a receiver circuit, located in said water tight housing and coupled to said array of ultrasonic transducers, which processes and combines signals received by said array of ultrasonic transducers to generate an output signal; and
a phased clock generator which generates multiple phased clock signals, and a read only memory, both located in said water tight housing and coupled to said tranmitter and receiver circuits;
said read only memory generating predefined selection values for selecting ones of said multiple phased clock signals for driving each of said transducers in said array of ultrasonic transducers, in accordance with a specified angle value;
wherein said control signals sent by said controller include and angle value designating which direction said beam of acoustic energy is to be transmitted by said array of ultrasonic transducers.

5. A phased array acoustic transducer apparatus, comprising:
an array of ultrasonic transducers mounted in a water tight housing;
a phased clock generator which generates multiple phased clock signals, located in said water tight housing;
a transmitter circuit, located in said water tight housing and coupled to said array of ultrasonic transducers, comprising a set of M drivers each of which is coupled to a corresponding transducer in said array of ultrasonic transducers, wherein each of said M drivers amplifies a selected one of said multiple phased clock signals for driving said corresponding transducer;
a receiver circuit, located in said water tight housing and coupled to said array of ultrasonic transducers, comprising a set of mixers which mix signals received by each transducer in said array of ultrasonic transducers with a corresponding selected one of said multiple phased clock signals and then sums said mixed signals to generate an output signal;
a controller, coupled to said array of ultrasonic transducers by a cable, which sends power via said cable to said phased clock generator, receiver and transmitter circuits, and which also sends control signals via said cable to said transmitter and receiver circuits.

6. The phased array acoustic transducer apparatus of claim 5, wherein said controller sends a gating signal via said cable to said transmitter circuit, said gating signal enabling and disabling operation of said drivers in accordance with a pulse-echo mode of operation.

7. The phased array acoustic transducer apparatus of claim 5, further including a display unit coupled to said controller;
wherein said controller automatically sends a sequence of control signals that cause said transmitter circuit in conjunction with said array of ultrasonic transducers to generate a sequence of directed beams of acoustic energy, said controller automatically collecting from said receiver circuit resulting output signals and generating therefrom a corresponding image on said display unit.

8. The phased array acoustic transducer apparatus of claim 5, further including a read only memory, located in said water tight housing and coupled to said transmitter and receiver circuits, said read only memory generating predefined selection values for selecting one of said multiple phased clock signals for each of said drivers and for each of said mixers in accordance with a specified angle value;
wherein said control signls sent by said controller include an angle value designating which direction a beam of acoustic energy is to be transmitted by said array of ultrasonic transducers.

* * * * *